US012671736B2

(12) United States Patent
Bandeira et al.

(10) Patent No.: US 12,671,736 B2
(45) Date of Patent: Jun. 30, 2026

(54) SELF-LEARNING SYSTEM WITH SENSORS

(71) Applicant: SCHREDER ILUMINAÇAO SA, Carnaxide (PT)

(72) Inventors: Lourenço Bandeira, Carnaxide (PT); André Glória, Carnaxide (PT); Michael Steurer, Carnaxide (PT)

(73) Assignee: SCHREDER ILUMINAÇAO SA, Carnaxide (PT)

( * ) Notice: Subject to any disclaimer, the term of this patent is extended or adjusted under 35 U.S.C. 154(b) by 430 days.

(21) Appl. No.: 18/256,129

(22) PCT Filed: Dec. 7, 2021

(86) PCT No.: PCT/EP2021/084638
§ 371 (c)(1),
(2) Date: Jun. 6, 2023

(87) PCT Pub. No.: WO2022/122755
PCT Pub. Date: Jun. 16, 2022

(65) Prior Publication Data
US 2024/0048619 A1 Feb. 8, 2024

(30) Foreign Application Priority Data
Dec. 7, 2020 (NL) ...................................... 2027062

(51) Int. Cl.
*H04L 12/24* (2006.01)
*H04L 41/0803* (2022.01)
*H04L 41/16* (2022.01)
*H04L 67/125* (2022.01)

(52) U.S. Cl.
CPC ............ *H04L 67/125* (2013.01); *H04L 41/16* (2013.01)

(58) Field of Classification Search
CPC ...... H04L 67/125; H04L 41/16; G06F 9/5072
USPC .......................................................... 709/224
See application file for complete search history.

(56) References Cited

U.S. PATENT DOCUMENTS

| | | | | |
|---|---|---|---|---|
| 9,111,221 B1 * | 8/2015 | Kelly | ..................... | G08B 13/19 |
| 11,429,807 B2 * | 8/2022 | Pradeep | .................. | G06T 7/254 |
| 2011/0130915 A1 * | 6/2011 | Wright | .................. | G01M 17/04 |
| | | | | 398/118 |

(Continued)

OTHER PUBLICATIONS

PCT International Search Report and Written Opinion, Application No. PCT/EP2021/084638, mailed Mar. 29, 2022, 13 pages.

*Primary Examiner* — Moustafa M Meky
*Assistant Examiner* — Elizabeth Kassa
(74) *Attorney, Agent, or Firm* — McDonnell Boehnen Hulbert & Berghoff LLP

(57) ABSTRACT

Example embodiments relate to system including at least a first sensor and a second sensor arranged at one or more edge devices, the first sensor, respectively the second sensor, being configured for obtaining first, respectively second, environmental data related to an event in the vicinity of the one or more edge devices; a first processing means configured to process said first environmental data in accordance with a first set of rules to generate first processed data and a second processing means configured to process said second environmental data in accordance with a second set of rules to generate second processed data; a control means configured to control the first and second processing means such that the second processed data is used to train the first processing means.

20 Claims, 9 Drawing Sheets

(56) References Cited

U.S. PATENT DOCUMENTS

| | | | |
|---|---|---|---|
| 2019/0103021 A1* | 4/2019 | Rosen | F21V 23/0478 |
| 2019/0104595 A1* | 4/2019 | Rosen | H04L 12/282 |
| 2019/0220698 A1* | 7/2019 | Pradeep | G06T 7/75 |
| 2019/0222652 A1* | 7/2019 | Graefe | H04L 67/12 |
| 2020/0137420 A1* | 4/2020 | Natanzon | H04N 19/625 |
| 2020/0357276 A1* | 11/2020 | Yang | H04N 7/181 |
| 2021/0199480 A1* | 7/2021 | Cocciadiferro | G01F 1/36 |
| 2022/0110265 A1* | 4/2022 | Chakraborty | G06F 16/2445 |

* cited by examiner

FIG. 1 control means 17, 27

Figure 1:
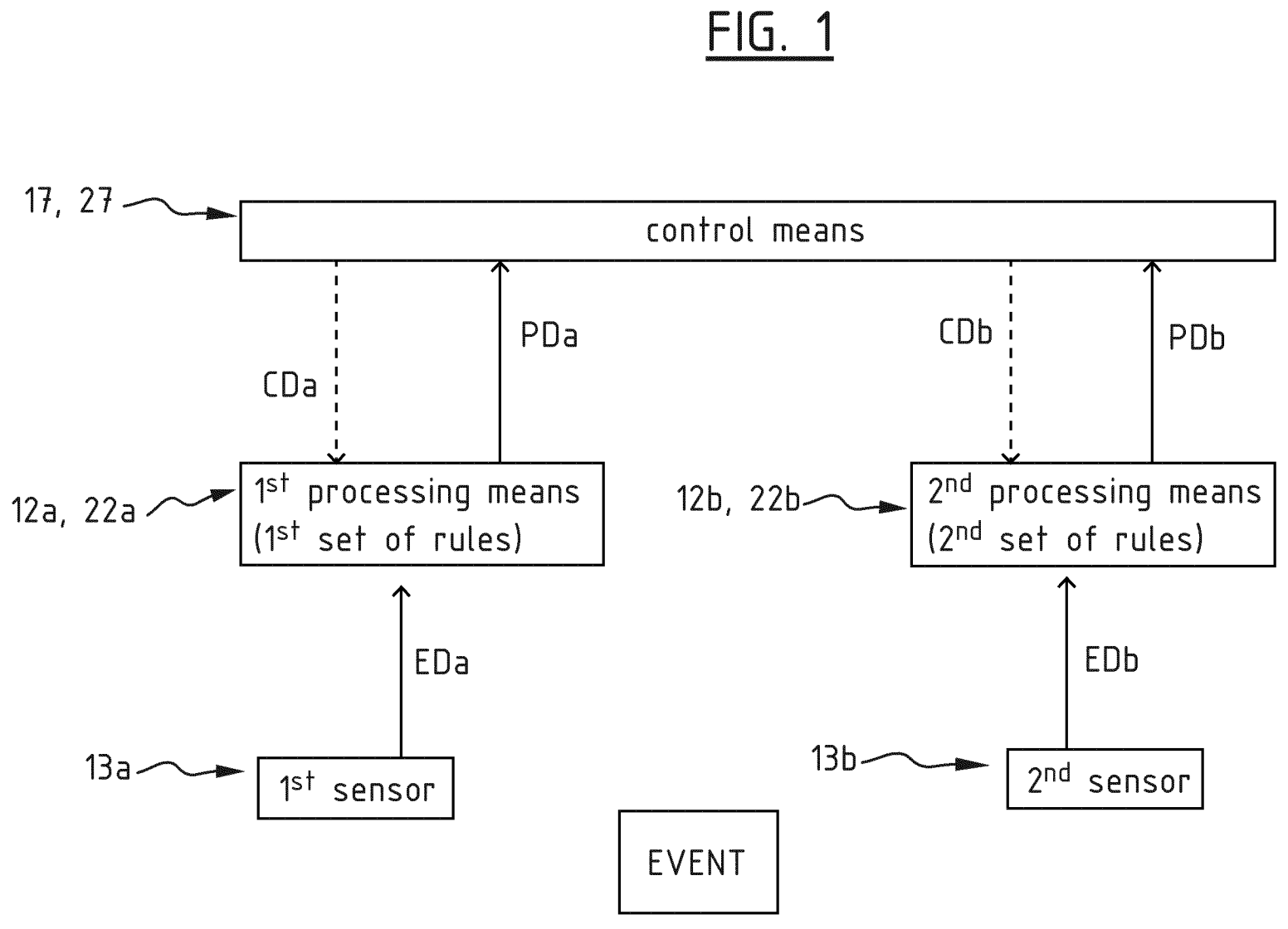

PDb

CDb

2<sup>nd</sup> processing means
(2<sup>nd</sup> set of rules)

12b, 22b

EDb

2<sup>nd</sup> sensor

13b

EVENT

PDa

CDa

1<sup>st</sup> processing means
(1<sup>st</sup> set of rules)

12a, 22a

EDa

1<sup>st</sup> sensor

Figure 3:
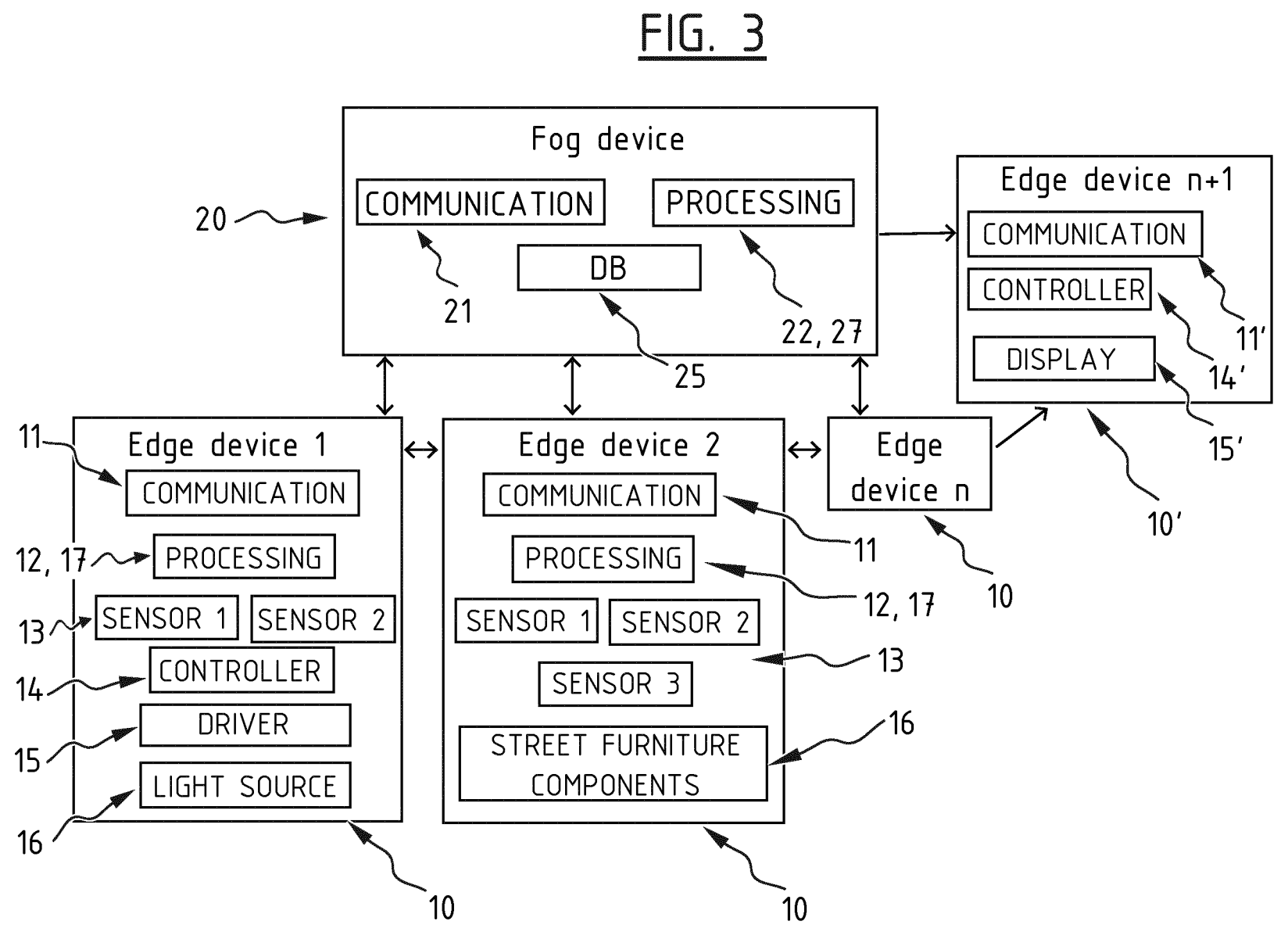

Edge device n+1
- COMMUNICATION — 11'
- CONTROLLER — 14'
- DISPLAY — 15'

10'

Fog device — 20
- PROCESSING — 22, 27
- DB — 25
- COMMUNICATION — 21

Edge device n — 10

Edge device 2 — 10
- COMMUNICATION — 11
- PROCESSING — 12, 17
- SENSOR 1
- SENSOR 2 — 13
- SENSOR 3
- STREET FURNITURE COMPONENTS — 16

Edge device 1 — 10
- COMMUNICATION — 11
- PROCESSING — 12, 17
- SENSOR 1
- SENSOR 2 — 13
- CONTROLLER — 14
- DRIVER — 15
- LIGHT SOURCE — 16

Figure 7:
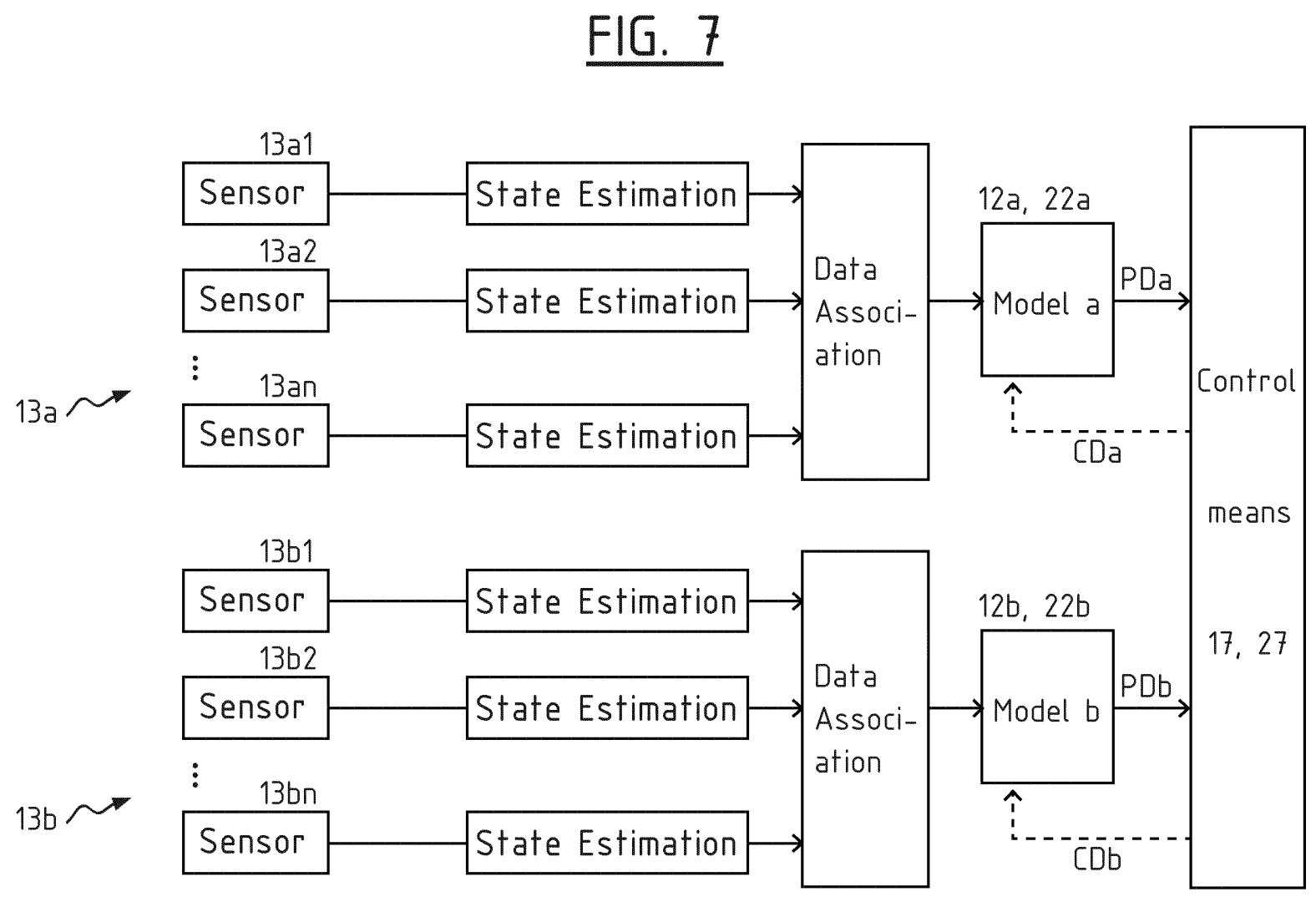

Control means 17, 27

PDa

PDb 12a, 22a — Model a 12b, 22b — Model b

CDa

CDb

Data Association

Data Association

State Estimation

State Estimation

State Estimation

State Estimation

State Estimation

State Estimation

13a1 Sensor

13a2 Sensor

... 13an Sensor

13b1 Sensor

13b2 Sensor

... 13bn Sensor

SELF-LEARNING SYSTEM WITH SENSORS

CROSS-REFERENCE TO RELATED APPLICATIONS

The present application is a national stage entry of PCT/ EP2021/084638 filed Dec. 7, 2021, which claims priority to NL 2027062 filed Dec. 7, 2020, the contents of each of which are hereby incorporated by reference.

FIELD OF INVENTION

The present invention relates to a system comprising edge devices having sensors, in particular a smart-city system.

BACKGROUND

A city's task in providing quality public space for its citizens lies not only in reserving sufficient areas but also in ensuring that the conditions, such as maintenance and management, enable it to be used to its full potential. This introduces additional concerns about the quality of the public space, ensuring safety of use, and its accessibility to all user groups as well as the financial burden incurred by the creation and maintenance of public spaces.

To address those challenges cities will increasingly apply new technologies and innovation across a wide range of sectors, from transport and mobility to citizen engagement. In particular, Information and Communication Technologies (ICT) are used increasingly to solve existing and rising challenges within cities. So-called digital cities or smart-cities emerge, producing a lot of data, such that controlling the data volume, assuring security and privacy and future scalability of such systems are essential.

It is common practice today to use a Cloud computing architecture approaches between sensors and actors deployed in smart cities, limiting the free flow of information between devices due to the centralistic nature of the architecture. One approach to address the explosion of the Internet of Things (IoT) and the ability to collect, analyze and provide big data in the cloud is edge computing; a new computing paradigm in which data is processed at the edges, i.e. at the sensor's level.

Edge Computing refers to the approach to push the process of knowledge discovery from the cloud further towards the connected end devices, also called IoT devices or edge devices. Edge computing relies on data sensed on the edge such that the quality of the sensors on the edge acts as a limiting factor to edge computing.

SUMMARY

The object of embodiments of the invention is to provide a system comprising edge devices, in particular for a smart-city, with improved sensing of environmental data.

According to a first aspect of the invention, there is provided a system comprising one or more edge devices. The one or more edge devices are preferably arranged in the vicinity of each other. The system comprises at least a first sensor and a second sensor, a first processing means and a second processing means, and a control means. The at least first sensor and second sensor are arranged at the one or more edge devices. The first sensor is configured for obtaining first environmental data related to an event in the vicinity of the one or more edge devices, and the second sensor is configured for obtaining second environmental data related to an event in the vicinity of the one or more edge devices.

The first processing means is configured to process said first environmental data in accordance with a first set of rules to generate first processed data and the second processing means is configured to process the second environmental data in accordance with a second set of rules to generate second processed data. The control means is configured to control the first and second processing means such that the second processed data is used to train the first processing means.

In this way, the second sensor may teach the first sensor how to improve its processing of the first environmental data related to the observed event. More in particular, the second processed data may reveal more about the event than the first processing means is capable of deriving from the first environmental data using the first set of rules, and the second processed data may teach the first processing means how to improve its processing so that additional and/or more accurate information is derived from the first environmental data. This training of a first processing means associated with a first sensor by using processed data from a second sensor is based on knowledge sharing and will lead to a higher accuracy. It is noted that a set of rules can be understood as equivalent to a model, insofar as a model is defined by a set or rules.

Embodiments of the invention are further based on the insight that multiple sensors can derive more information about an event. For instance while an optical sensor has high accuracy and a long reach during bright days, it is less reliable with heavy rain or dark nights. In the same way, a micro Doppler radar is able to produce very recognizable features of a car at a close distance, but it creates indistinctive data at far reach. In addition, the image sensor may learn from the radar and vice versa. Another possibility would be to combine a sound sensor with a radar and/or optical sensor. From the sound sensor alone it is very difficult to separate two distinct objects but combined with an optical sensor the information pool becomes richer. Also, the sound sensor can be trained by an optical sensor and/or a radar and vice versa.

According to an exemplary embodiment, training the first processing means comprises changing the first set of rules. The control means is configured for generating first control data to change the first set of rules of said first processing means. In this way, the operation of the first processing means may be retrained to improve its set of rules for deriving information about the event from the first environmental data, in order to improve the deriving of information about the event by the first processing means.

According to an exemplary embodiment the second processing means is configured to use said first processed data to process said second environmental data in accordance with the second set of rules to generate the second processed data. In this way, the operation of the second processing means may benefit from the first processing done by the first processing means to refine the second processed data to finally better the first processing means.

According to an exemplary embodiment, the first processing means is configured to use additional environmental data from one or more additional data sources to process said first environmental data and/or the second processing means is configured to use the additional environmental data from one or more additional data sources to process said second environmental data. In this way, more environmental data may be used by the processing means to improve the quality of the processed data.

According to an exemplary embodiment, the first sensor and the second sensor are configured to obtain data about a same event, and the first set of rules and the second set of rules each comprise rules for deriving properties of the event based on the obtained first and second environmental data, respectively. In this way, a correlation between the data obtained from the first and the second sensor may be established and used for retraining the first set of rules used for the processing of the first environmental data, in order to for instance generate a model which may further be used to classify the data or predict data.

According to an exemplary embodiment, the first set of rules is configured to select one or more classes from a first plurality of predetermined classes for classifying the event, to obtain a first classification based on the first environmental data and wherein the second set of rules is configured to select one or more classes from a second plurality of predetermined classes for classifying the event, to obtain a second classification for the same event based on the second environmental data. In this way data from multiple sensors is combined to achieve improved accuracy and more specific inferences than could be achieved using a single sensor alone. The first sensor and the second sensor may both be configured to classify the same event, but the way the classification is used may be different. The first and second classification may be the same or different. For example, one way of classifying may use more subclasses or different classes than another classification. For example, the classification that may be associated with an image sensor may be different from the classification that may be associated with a sound sensor. However, an image sensor may learn from a sound sensor and vice versa. For example, where an image sensor may be capable of determining a type of vehicle (electric and non-electric vehicle having different license plates), a sound sensor may have to be trained before being capable of distinguishing the sound of a first type of vehicle (electric vehicle) from the sound of a second type of vehicle (non electric vehicle).

The skilled person understands that also more than two sensors may be present and capable of determining the same type of events or different types of events. Also, environmental data from a first and third sensor may be combined to determine a class instead of deriving a class from the environmental data from the first sensor alone. In some more advanced embodiments, neighboring edge devices may exchange locally sensed data, and the data from a neighboring edge device may be used to help determining a class of a locally detected event. For example, when a first edge device detects a moving object moving towards a second edge device, it may inform the second edge device that an object is approaching, allowing the second device to obtain data about the object in an improved manner and/or to determine processed data in an improved manner.

According to an exemplary embodiment, the first set of rules is configured to generate a first attribute associated to the event based on the first environmental data, said first attribute characterizing a property of the event and/or wherein the second set of rules is configured to generate a second attribute associated to the event based on the second environmental data, said second attribute characterizing a property of the event. In this way, more data content can be achieved for applications where classes and attributes may both be needed. In particular, the following sets of classes and attributes may be used for the following events/objects involved in events:

for vehicles, classification may be by type of vehicle (car, truck, motorcycle, bicycle), size of vehicle (big, small, intermediate), model of vehicle, color of vehicle; and a corresponding set of attributes may be number plate, speed, direction, number of occupants;

for animals, classification may be by type of animal; leashed or not; normal/violent behavior for persons, classification may be by type of individual whether civil/military/policeman/first responder; normal/violent behavior, moving/static, wearing a mask/not wearing a mask; and a corresponding set of attributes may be speed, direction, number of people;

for buildings, classification may be by type of building; an attribute may be the location;

for street furniture, classification may be by type, status; an attribute may be the location;

for a driver for driving a light source of a luminaire, classification may be by status (normal/abnormal behavior), an attribute may be the power consumption value;

for a trash bin, a traffic light, a charging station, a parking station, classification may be by status (full/not full, available/unavailable, operational/out of order), an attribute may be the location for a street or pavement surface, classification may be according to status (dry/wet), an attribute may be the amount of humidity, the location;

for a visibility condition, classification may be good/bad visibility;

for a noise, classification may be by noise level above a threshold, attributes may be frequency, level, duration of the noise;

for a change in the weather, classification may be by type of weather (fog, sun, rain, wind);

attributes may be the amount of rain, humidity level, snow level, wind speed, the temperature, the light level;

for a pollution level, classification may be by safe/warning/unsafe, presence/absence of pollutants; attributes may be the ppm value of pollutants;

for a security related incident, classification may be the type of incident; attributes may be the noise in dB, the location, the radiation level, a chemical composition.

It is further noted that a piece of raw data generated by a data source may also be considered as an attribute. For instance may be regarded as attributes for a sound sensor, a sound recording, for a camera sensor, an image or a video recording, etc.

According to an exemplary embodiment, the control means is configured to control the first and second processing means such that the second classification and/or second attribute is used to train the first processing means. In this way, processing means may teach each other on how to classify events, in a self learning manner increasing the autonomy and intelligence of the first processing means.

According to an exemplary embodiment, the control means is configured to control the first and second processing means such that the second classification and/or second attribute is used to change the first set of rules such that a class preferably from the second plurality of predetermined classes is added to the first plurality of predetermined classes and/or to generate the first attribute. In other words the second sensor and its associated second processing means are teaching another classification of an event to the first processing means. One example thereof may be when the first processing means is initially not capable of classifying an event at all and is taught how to do so using classification from another data source. For instance a first processing means may not be able at beginning to classify vehicles according to their type based on the sensed data of a sound sensor. Yet a second processing means receiving data from a camera sensor may be able to provide such a classification on the basis of the type of vehicle (car, truck, bike). In such a case, the control means can control the first processing means such that the classification of sound by type of vehicle is taught to the first processing means on the basis of the second classification performed based on image data. Another example thereof may be when a first processing means may use the classification from a low resolution camera, running continuously, to activate a high resolution camera, normally turned off to save power and resources. When activated based on the result of the classification of the low resolution camera (when vehicle is detected), the high resolution camera may then generate as attribute the number plates of the detected vehicle. Another example thereof may be when a first processing means may use a number plate attribute from a high quality camera capturing number plates, to generate an image attribute of another camera having a lower quality but a larger field view able to capture the vehicle in its environment, by incorporating the number plate on the image of the vehicle in its environment. Another example may be when the attribute of a sound sensor, like a sound recording, is used to generate an attribute of a camera, for instance a video recording augmented with the sound recording.

According to an exemplary embodiment, the control means is configured to control the first and second processing means such that the second classification and/or second attribute is used to change the first set of rules such that a sub-classification level is added to the first classification. In other words the second sensor and its associated second processing means are teaching a finer classification of an event to the first processing means. One example thereof may be when the second sensor is a camera and the first sensor is a radar. The first processing means associated with the radar may only be able initially to classify broadly the size of an object (small, large object), whereas the classes for the environmental data from the camera may be much more precise (car, truck, bike, pedestrian), such that the classification used for the camera may be used to add sub classes to the class "small object" as being either a bike or pedestrian, and to the class "large object" as being either a car or a truck. The quality and accuracy of the classification of the first processing means is in this way greatly increased. As well redundancy is improved, since a defective sensor would have less influence on the whole system once all processing means have been trained to the best of the possibilities.

According to an exemplary embodiment, the event comprises one of an event related to an object in the one or more edge devices or their vicinity, an event related to a state of an object in the one or more edge devices or their vicinity, an event related to the area in the vicinity of the one or more edge devices, an event related to a state of a component of the one or more edge devices. In this way, a valuable environmental stimulus may be detected. Among others, the following events may for instance be detected:

an event related to an object (both static and dynamic) and/or its state in the vicinity of the one or more edge devices, where objects may be vehicles, animals, persons, buildings, street furniture (trash bin, bus stop), a communication cabinet, a charging station, a street sign, a traffic sign, a traffic light, a telecommunication cabinet. For instance may then be detected the presence/movement of vehicles and other objects, a trash bin reaching its full state, a surface, such as a street or pavement surface, changing from a dry to a wet state, the state of a traffic sign or a traffic light, the state (in use or not) of a charging station, the state of a parking space;

an event related to a state of a component of the one or more edge devices. For instance a fault condition (leakage current, failed surge protection device, power failure, solder joint failure) in a luminaire head may be detected;

an event related to the environment itself, for instance the detection of a visibility condition, the detection of a change in the weather like rain, fog, sun, wind, the detection of a pollution level, the detection of a light level; the detection of an incident in the vicinity of the one or more edge devices such as a security related incident, e.g. an explosion, a car accident, a fire, flooding, an earthquake, a riot, a gun shot, presence of gas (chemicals), radiation, smoke.

According to an exemplary embodiment, the control means is configured to control the second processing means such that the first processed data is used to train the second processing means. In this way, the relationship teacher/student may be reversed between the first and second processing means. Preferably, training the second processing means comprises changing the second set of rules, and the control means is configured for generating second control data to change the second set of rules of said second processing means. In this way, processing means may teach each other on how to model events in a bidirectional way.

According to an exemplary embodiment, the control means is configured to determine whether the one or more edge devices operate in a first modus where the first processing means is known to provide better results than the second processing means or in a second modus where the second processing means is known to provide better results than the first processing means. The control means is configured to control the first and second processing means such that the second processed data is used to train the first processing means in the second modus, and to control the first and second processing means such that the first processed data is used to train the second processing means in the first modus. In this way, an adaptive teacher-student relationship may be established based on which sensor has the best results in a certain modus. An application may be the calibration of a sensor having a low resolution by a sensor having a high resolution.

In particular in an exemplary embodiment, the control means is configured to determine whether the one or more edge devices operate in the first or second modus based one any one or more of the following conditions: a time of the day, a date of the year, a weather condition, a light intensity, a humidity level, a temperature, a pollution level, a type of event, age or lifetime of the first and/or second sensor. For instance while the optical sensors have high accuracy and a long reach during bright days, they are less reliable with heavy rain or dark nights. In the same way, a micro Doppler radar is able to produce very recognizable features of a car at a close distance, but it creates indistinctive data at far reach. Also, from a sound sensor alone it may be difficult to separate two distinct objects but combined with an optical sensor the information pool becomes richer. In this way, limiting environmental factors for a sensor, like the noise level or the visibility, may be compensated based on a retraining based on data coming from another sensor not suffering from the same limiting factors.

According to an exemplary embodiment, the first sensor and the second sensor are arranged in the same edge device. In this way, a more autonomous and intelligent edge device may be achieved.

In an exemplary embodiment, the first sensor and the second sensor are connected to a common interface board of the edge device. In this way a universal interface may be provided insuring compatibility of data and power signals between sensors and edge processing means. More in particular, an optical sensor, a sound sensor and a radar may be connected to the same common interface support such that the combination of these sensors can be easily interconnected in any kind of edge device in a cost-effective manner.

In another exemplary embodiment, the first sensor and the second sensor are arranged in neighboring edge devices. In this way, edge devices can propagate their knowledge to the network of edge devices around them, increasing the level of accuracy and intelligence of the whole connected system. In this way a flexible solution is provided with a first multi-sensor or single-sensor edge devices being able to teach another multi-sensor or single-sensor edge device for instance.

In a possible embodiment, the first processing means and/or the second processing means are arranged in the one or more edge devices. More in particular the first processing means may be arranged in the same edge device as the first sensor and the second processing means may be arranged in the same edge device as the second sensor. If both the first and second sensors are arranged in the same edge device, also the first and second processing means and the control means may be arranged in that edge device.

According to an exemplary embodiment, there is provided a fog device at a distance of the one or more edge devices. The first processing means and/or the second processing means may then be arranged in the fog device. Optionally also the control means could then be provided in the fog device. In this way, part of the processing is thus shifted from the edge devices to the fog device, taking advantage of the available computational resources in the fog device.

According to an exemplary embodiment, the first and/or second sensor is selected from: an optical sensor such as a photodetector or an image sensor, a sound sensor, a radar such as a Doppler effect radar, a LIDAR, a humidity sensor, a pollution sensor, a temperature sensor, a motion sensor, an antenna, an RF sensor, a vibration sensor, a metering device (e.g. a metering device for measuring the power consumption of a component of an edge device, more in particular a metering device for measuring the power consumption of a driver of a luminaire), a malfunctioning sensor (e.g. a sensor for detecting the malfunctioning of a component of an edge device such as a current leakage detector for measuring current leaks in a driver of a luminaire), a measurement device for measuring a maintenance related parameter of a component of the edge device, an alarm device (e.g. a push button which a user can push in the event of an alarming situation). In this way, environmental data about an event in the vicinity of an edge device may be detected, e.g. characteristics (presence, absence, state, number) of objects like vehicles, street furniture, animals, persons, sub-parts of the edge device, or properties related to the environment (like weather (rain, fog, sun, wind), pollution, visibility, earth quake) or security related events (explosion, incident, gun shot, user alarm) in the vicinity of the edge device, maintenance related data or malfunctioning data of a component of the edge device. The first and/or second sensor may be of different nature, to better complement each other or of the same nature to help calibrate each other.

According to an exemplary embodiment, the first and second sensors are selected from an optical sensor such as a photodetector or an image sensor, a sound sensor and a radar such as a Doppler effect radar. Such a combination of sensors is both practical and efficient mimicking the human senses of touch, hearing and sight. Preferably, the optical sensor is an image sensor such as a camera. It has been found that the combination of these three sensors in an edge device allows for an accurate classification of objects in the vicinity of the edge device, at all times of the day.

According to an exemplary embodiment, the first and/or second sensor may be mounted in a housing of an edge device, e.g. a luminaire, in an orientable manner. An example of a suitable mounting structure is disclosed in WO 2019/243331 A1 in the name of the applicant which is included herein by reference. Such mounting structure may be used for arranging e.g. an optical sensor in the housing of an edge device. Other suitable mounting structures for mounting the first and/or second sensor are described in WO 2019/053259 A1, WO 2019/092273 A1, WO 2020/053342 A1, WO 2021/094612 A1, all of which are in the name of the applicant and included herein by reference. Although those patent specifications relate in particular to luminaire edge devices in which one or more sensors are provided, the skilled person understands that one or more sensors may be mounted in a similar way in another type of edge device.

According to an exemplary embodiment, the one or more edge devices are arranged in a mesh network. In this way edge devices can communicate directly with each other for a fast control. Reliability is also further improved due to redundant communication links. In particular, a fog device is also part of the mesh network. Preferably the edge communication means and optionally the fog communication means are configured to communicate through an IEEE 802.15.4 protocol.

Preferably, the edge devices are configured to transmit edge processed data to its associated fog device using a wireless personal area network (WPAN), preferably as defined in the IEEE 802.15.4 standard. According to another exemplary embodiment, the edge devices are configured to transmit edge processed data to its associated fog device through an LPWAN network, e.g. a LoRaWAN network or a SigFox network.

For example, the communication between the edge devices and its associated fog device may be based on a short range protocol such as IEEE 802.15.4 (e.g. Zigbee) or on a long range communication protocol such as LoRa wireless data communication technology. The network may be managed by the fog device or by a separate segment controller. In such a solution the edge device may only be capable of communicating through the short range communication protocol. However, it is also possible that some edge devices are capable of communicating both through a short-range and a long-range protocol. Also the fog device may be integrated with one of the edge devices, e.g. one of the luminaires of a group of luminaires could function as the fog device for a group of edge devices comprising the group of luminaires and possibly also other edge devices.

Preferably, the fog devices are capable of communicating through a network comprising a cellular network with a central control system.

According to an exemplary embodiment, the control means is configured to adjust measurement settings of the first sensor based on the second processed data and/or to adjust measurement settings of the second sensor based on the first processed data. In particular variables of operation of a sensor like the frequency of a sound sensor, the light exposure or view field of a camera may be dynamically adjusted to benefit from the self-learning capabilities of the system. A measurement setting typically refers to a setting which affects the sensed environmental data obtained by the sensor whilst the set of rules used to process the sensed environmental data will influence the processing of the sensed data. Thus, according to exemplary embodiments not only the processing but also the measurements itself may be improved.

According to an exemplary embodiment, there is provided a communication means configured to receive data about an event in the one or more edge devices or in their vicinity from a central database and/or from the fog device. The first and/or second processing means may then be configured to use said data for processing the first and/or second sensed data and/or for training the first and/or second processing means. In this way more depth in the classification may be attained using additional information from a database. For instance, special vehicles like ambulances may be further identified using data from a dedicated database. Preferably the data in a database includes any one or more of the following: weather related information for the vicinity of the subset, traffic information for the vicinity of the subset, geo-coordinates of the edge devices of the subset, news and internet information, public transportation information, events (fairs, concerts, etc.) schedules, timing information (weekday, weekend, public holiday), public safety information, sanitary reports, security reports, road condition reports and cellphone data of cellphones in the vicinity of the subset. In this way, context data may be incorporated in the classification and/or training process for further accuracy.

According to an exemplary embodiment, the control means is configured to adjust measurement settings of the first and/or second sensor based on the received data. In this way, data from a database may be put to use for calibration of the sensors, increasing further the accuracy of the multi-sensor system.

According to an exemplary embodiment, the one or more edge devices comprise any one or more of the following: a luminaire, a bin, a sensor device, a street furniture, a charging station, a payment terminal, a parking terminal, a street sign, a traffic light, a telecommunication cabinet, a traffic surveillance terminal, a safety surveillance terminal, a water management terminal, a weather station, an energy metering terminal, a lid in a pavement. Existing structures ubiquitously present in cities may be used for hosting networks, limiting in this way the aesthetic impact of installing such networks. Structures having already an access to the power grid are particularly interesting, while luminaires having just the right height to capture all kinds of valuable data from sensors are further particularly suited as edge devices.

BRIEF DESCRIPTION OF THE FIGURES

This and other aspects of the present invention will now be described in more detail, with reference to the appended drawings showing preferred embodiments of the invention. Like numbers refer to like features through out the drawings.

FIG. 1 illustrates an exemplary embodiment of a self-learning system with two sensors, further illustrating the interaction between sensors, control means and processing means.

FIG. 2 illustrates an exemplary embodiment of a network architecture in which the embodiment of FIG. 1 may be implemented.

FIG. 3 illustrates the regional level of the architecture of FIG. 2 showing a fog device and multiple edge devices.

FIG. 4 illustrates a scenario where an event is observed by two edge devices.

FIGS. 7 to 9 illustrate alternative exemplary embodiments of self-learning systems using models.

DESCRIPTION OF EMBODIMENTS

Figure 5:
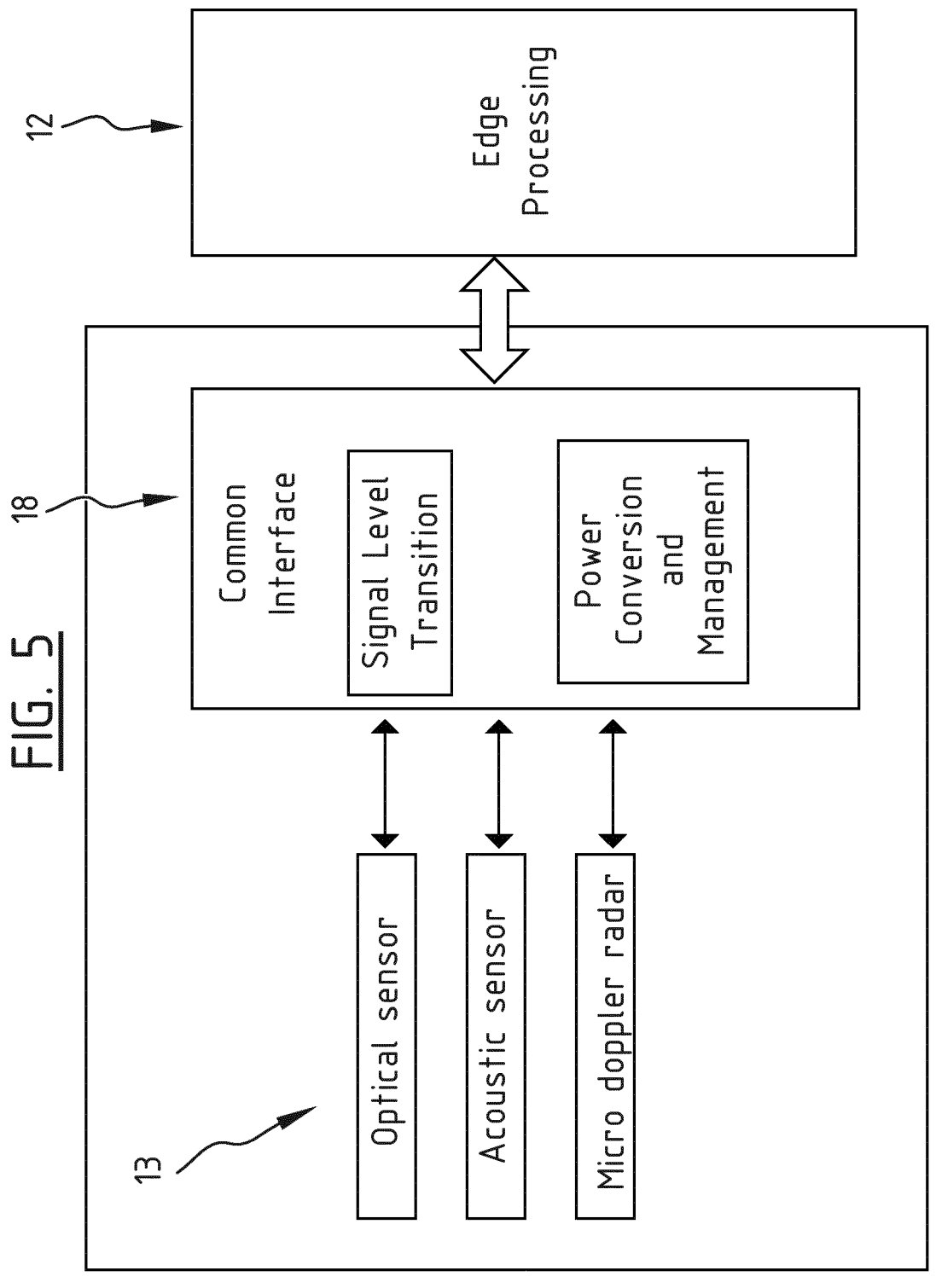
FIG. 5 illustrates an exemplary embodiment of an edge device comprising a common interface board and three sensors.

FIG. 1 illustrates an exemplary embodiment of a system with two sensors, further illustrating the interaction between sensors, control means and processing means according to the invention.

In an embodiment, a first sensor 13a and a second 13b may be arranged on two neighboring edge devices. In that case the first sensor 13a may be configured for obtaining first environmental data EDa related to an event in the vicinity of a first edge device while the second sensor 13b may be configured for obtaining second environmental data EDb related to an event in the vicinity of a second edge device.

In another embodiment, the first 13a and the second sensor 13b may be arranged on the same edge device, the sensors 13a and 13b may both be configured for obtaining first environmental data related to an event in the vicinity of the edge device.

A network system with a fog device and a plurality of edge devices will be described more in details in FIGS. 2 and 3. In that context, the system of the invention further comprises processing means which may be either arranged at an edge device or at a fog device. A first processing means in the edge device 12a or in a fog device 22a may be configured to process said first environmental data EDa in accordance with a first set of rules to generate first processed data PDa and a second processing means in the edge device 12b or in a fog device 22b is configured to process said second environmental data EDa in accordance with a second set of rules to generate second processed data PDa. A set of rules can be understood as defining a model of an environment.

Similarly, the system further comprises a control means 17 arranged at an edge device, or a control means 27 arranged at a fog device. The control means 17 or 27 may be configured to control the first and second processing means 12a and 12b, respectively 22a and 22b such that the second processed data PDb is used to train the first processing means 12b, respectively 22b. Training the first processing means 12a or 22a may comprise changing the first set of rules. The control means 17 or 27 may be configured for generating first control data CDa to change the first set of rules of said first processing means 12a or 22a.

In particular the first sensor and the second sensor may be configured for obtaining data about a same event, and the first set of rules and the second set of rules may each comprise rules for deriving properties of the event based on the obtained first and second environmental data, respectively.

The first set of rules may be particularly configured to attribute a first classification to the event based on the first environmental data and the second set of rules may be configured to attribute a second classification to the same event based on the second environmental data.

In general a set of rules may comprise a set of predetermined classes and/or attributes attributed to one or more events. In particular, the following list of classes and attributes may be used for the following events/objects involved in events:

for vehicles, classification may be by type of vehicle (car, truck, motorcycle, bicycle), size of vehicle (big, small, intermediate), model of vehicle, color of vehicle and a corresponding set of attributes may be number plate, speed, direction, number of occupants;

for animals, classification may be by type of animal; leashed or not; normal/violent behavior for persons, classification may be by type of individual whether civil/military/policeman/first responder; normal/violent behavior, moving/static, wearing a mask/ not wearing a mask; and a corresponding list of characterization attributes may be speed, direction, number of people;

for buildings, classification may be by type of building, an attribute may be the location;

for street furniture, classification may be by type, status, an attribute may be the location;

for a driver for driving a light source of a luminaire, classification may be by status (normal/abnormal behavior), an attribute may be the power consumption value;

for a trash bin, a traffic light, a charging station, a parking station, classification may be by status (full/not full, available/unavailable, operational/out of order), attributes may be the location;

for a street or pavement surface, classification may be according to status (dry/wet), an attribute may be the amount of humidity, the location;

for a visibility condition, classification may be good/bad visibility;

for a noise, classification may be by noise level above a threshold, attributes may be frequency, level, duration of the noise;

for a change in the weather, classification may be by type of weather (fog, sun, rain, wind), attributes may be the amount of rain, humidity level, snow level, wind speed, the temperature, the light level;

for a pollution level, classification may be safe/warning/ unsafe, presence of pollutants, attributes may be the value ppm of pollutants;

for a security related incident, classification may be the type of incident, attributes may be the noise in dB, the location, the radiation level, a chemical composition.

Upon installation and/or during operation, one set of rules may have to be trained or retrained due to an absence of initial calibration and/or wear of a sensor. In that case, the control means 17 or 27 may be configured to control the first and second processing means 12a and 12b, respectively 22a and 22b such that the second classification is used to train the first processing means 12a or 22a. The second classification may be used in particular to add a class and/or a sub class to the first classification.

Numerous applications are possible for this training of the classification of a processing means associated with one sensor based on processed data obtained from one or more other sensors. One example thereof may be when the first processing means is initially not capable of classifying an event at all and is taught how to do so using classification from another data source. For instance a first processing means may not be able at beginning to classify vehicles according to their type based on the sensed data of a sound sensor. Yet a second processing means receiving data from a camera sensor may be able to provide such a classification on the basis of the type of vehicle (car, truck bike). In such a case, the control means 17 or 27 can control the first processing means such that the classification of sound by type of vehicle is taught to the first processing means on the basis of the second classification performed on image data.

Another example may be when the second sensor is a camera and the first sensor is a radar. The first processing means associated with the radar may only be able initially to classify broadly the size of an object (small, large object), whereas the classes for the type of object from the camera may be much more precise (car, truck, bike, pedestrian), such that the classification used for the camera may be used to add sub classes to the class "small object" as being either a bike or pedestrian, and to the class "large object" as being either a car or a truck.

It is noted that the event may comprise one of an event related to an object in the one or more edge devices or in the vicinity of the one or more edge devices, an event related to a state of an object in the one or more edge devices or in the vicinity of the one or more edge devices or an event related to the area in the vicinity of the one or more edge devices or an event related to a state of a component of the one or more edge devices. This list is however not exhaustive and other events relevant for the system may be envisaged depending on the circumstances.

An event in one or more edge device or in the vicinity of one or more edge devices may comprise one of:

an event related to an object (both static and dynamic) and/or its state in the one or more edge devices or in the vicinity of the one or more edge devices, where objects may be vehicles, animals, persons, buildings, street furniture (trash bin, bus stop), a communication cabinet, a charging station, a street sign, a traffic sign, a traffic light, a telecommunication cabinet, objects thrown in a trash bin. For instance may be detected the presence/movement of vehicles and other objects, whether people are wearing a mask or not, a trash bin reaching its full state, the type of objects thrown in trash bin, a surface, such as a street or pavement surface, changing from a dry to a wet state, the state of a traffic sign or a traffic light, the state (in use or not) of a charging station, the state of a parking space;

an event related to a state of a component of the edge device, for instance a driver in a luminaire head detecting a fault condition (leakage current, failed surge protection device, power failure, solder joint failure);

an event related to the environment itself, for instance the detection of a visibility condition, the detection of a change in the weather like rain, fog, sun, wind, the detection of a pollution level, the detection of a light level, the detection of an incident in the vicinity of the edge device such as a security related incident, e.g. an explosion, a car accident, a fire, flooding, presence of gas (chemicals), radiation, smoke.

The list above is not exhaustive, and other events of interest may be detected depending on the circumstances.

Additionally the control means 17 or 27 may be configured to determine whether the one or more edge devices operate in a first modus where the first processing means 12a or 22a is known to provide better results than the second processing means 12b or 22b or in a second modus where the second processing means 12b or 22b is known to provide better results than the first processing means 12a or 22a, and the control means 17 or 27 is configured to control the first and second processing means 12a and 12b, or 22a and 22b, such that the second processed data PDb is used to train the first processing means 12a or 22a in the second modus, and to control the first and second processing means 12a and 12b, or 22a and 22b such that the first processed data PDa is used to train the second processing means 12b or 22b in the first modus. In particular the control means 17 or 27 may be configured to determine whether the one or more edge devices operate in the first or second modus based one any one or more of the following conditions: a time of the day, a date of the year, a weather condition, a light intensity, a humidity level, a temperature, a pollution level, a type of event.

For instance while the optical sensors have high accuracy and a long reach during bright days, they are less reliable with heavy rain or dark nights. In the same way, a micro Doppler radar is able to produce very recognizable features of a car at a close distance, but it creates indistinctive data at far reach. Also, from a sound sensor alone may be difficult to separate two distinct objects but combined with an optical sensor the information pool becomes richer. Therefore according to a humidity level or a light intensity or time of the day, the classification of one the three sensors (optical, sound, radar) may be more reliable, and used for training the other ones. In this way, the limiting environmental factors of a sensor, like the noise level or the visibility, may be compensated based on a retraining using data coming from another sensor not suffering from the same limiting factors.

More generally, the sensor 13 may comprise at least one of, preferably at least two sensors, of the following list: an optical sensor such as a photodetector or an image sensor, a sound sensor, a radar such as a Doppler effect radar, a LIDAR, a humidity sensor, a pollution sensor, a temperature sensor, a motion sensor, an antenna, an RF sensor capable of detecting radio waves from RF-enabled devices (such as phones, WiFi access points, Bluetooth devices and other devices), a vibration sensor, a metering device, a malfunctioning sensor, a measurement device for measuring a maintenance related parameter of a component of the edge device, an alarm device. The list above is not exhaustive, and other sensors may be envisaged depending on circumstances. In particular the sensor 13 of the first edge device may comprise an optical sensor such as a photodetector or an image sensor, a sound sensor, and a radar such as a Doppler effect radar. Such a combination of sensors is both practical and efficient mimicking the human senses of touch, hearing and sight.

In a further embodiment, communication means 11 arranged at an edge device or communication means 21 arranged at a fog device may be configured to receive data about an event in the vicinity of the one or more edge devices from a central database. The first and/or second processing means 12a and 12b, respectively 22a and 22b may be configured to use said data for processing the first and/or second sensed data and/or for training the first and/or second processing means. The data may for instance come from a weather database, a regulation database or an infrastructure database.

Alternatively or additionally to improve classification, the control means 17 or 27 may be configured to adjust measurement settings of the first and/or second sensor 13a and/or 13b for example based on the received data. This may be particularly the case when the first and the second sensors are of the same type and one has a higher resolution than the other one. The more accurate sensor may be used to calibrate the less accurate one, in particular in an initial training phase.

Figure 2:
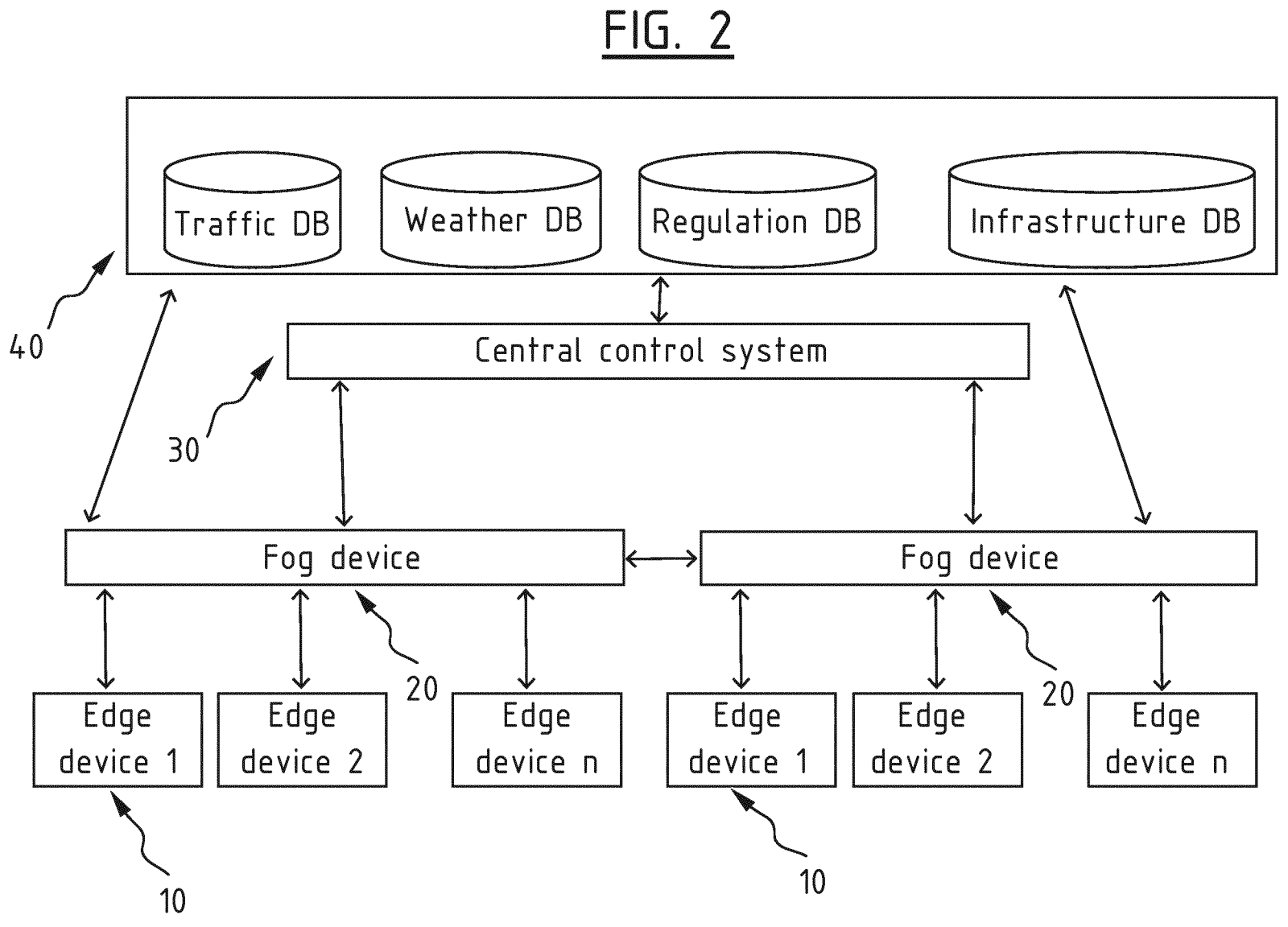

FIG. 2 illustrates a network system according to an exemplary embodiment of the system of FIG. 1. The network of FIG. 2 has a hierarchical architecture, with a first level of edge devices an intermediate level of fog devices 20 and a top level with a central control system 30.

The network system of FIG. 2 may comprise a plurality of edge devices 10 arranged at a plurality of locations. The edge devices may for instance be spread in a smart-city and the plurality of edge devices 10 may comprise any one or more of the following: a luminaire, a bin, a sensor device, a street furniture, a charging station, a payment terminal, a parking terminal, a street sign, a telecommunication cabinet, a traffic surveillance terminal, a safety surveillance terminal, a water management terminal, a weather station, an energy metering terminal. This list is not exhaustive and other edge devices may be envisaged depending on circumstances.

Preferably, a fog device 20 and the associated subset of edge devices 10 may be arranged in a mesh network. For example, the edge devices may be configured to transmit edge processed data to its associated fog device using a wireless personal area network (WPAN), preferably as defined in the IEEE 802.15.4 standard. Thus, the communication between the edge devices 10 and its associated fog device 20 may be based on a short range protocol such as IEEE 802.15.4 (e.g. Zigbee). The network may be managed by the fog device or by a separate segment controller.

A fog device 20 may be defined as having less processing and storage capabilities than a central control means 30 but more processing, storage and communication capabilities than an edge device 10 When the central control means 30 operates under the principle of cloud computing, the intermediate level of processing performed by fog devices 20 is referred to as fog computing. Fog computing may comprise a certain degree of distribution of the processing among a plurality of fog devices 20 arranged in a mesh with the edge devices 10.

A segment controller insofar as able to communicate with at least two edge devices 10 via short range communications and able to communicate with a central control means 30 via long range communications, may operate as a fog device 10 according to the present invention.

The plurality of fog devices 20 may be configured to communicate with the central control system 30 through a cellular network.

In such a solution the edge device 10 may only be capable of communicating through the short range communication protocol. However, it is also possible that at least some edge devices 10 are capable of communicating both through a short-range protocol and a long-range protocol (e.g. through the cellular network). Also a fog device 20 may be integrated with one of the edge devices 10, e.g. one of the luminaires of a group of luminaires could function as the fog device for a group of edge devices comprising the group of luminaires and possibly also other edge devices.

Each fog device 20 may be associated with a subset of a plurality of edge devices 10 located geographically in the vicinity of each other and forming a regional subset of edge devices 10. In an example a subset of edge devices 10 may be defined for edge devices installed in the same neighborhood, whether installed on luminaires, traffic lights, trash bins or any other infrastructure. The subset may alternatively be selected on the basis of a common purpose or property between edge devices 10. In an example, a subset of edge devices may be defined for edge devices installed on luminaires lighting the same road.

Additionally a database level 40 may be provided and may comprise among others a traffic database, a weather database, a regulation database or an infrastructure database. The database level 40 may be in communication with the plurality of fog devices 20 and/or the central control system 30.

FIG. 3 illustrates further the regional level of the architecture of FIG. 2, where a fog device 20 is associated with a subset of edge devices 10. The subset of edge devices 10 comprises at least a first and a second edge device 10, each comprising at least one sensor 13, such as a sensor, configured to obtain environmental data, said environmental data being related to an event in the edge device or its vicinity. In addition, the subset of edge devices 10, 10' may comprise edge devices 10' (only one is shown which is numbered as n+1) which do not contain data sources, but which are still capable of communicating with the fog device 20. All edge devices 10, 10' comprise an edge communication means 11, 11' configured for communicating with the fog device 20.

The first edge device 10 may comprise three sensors, Sensor 1, Sensor 2, Sensor 3, as data sources 13, each configured to obtain environmental data related to an event in the edge device 10 or its vicinity. In a similar way the second edge device 10 may comprise two sensors, Sensor 1, Sensor 2, as data sources 13, each sensor being also configured to obtain environmental data related to an event in the edge device 10 or its vicinity. The first sensor may be configured to obtain first sensed data and the second sensor configured to obtain second sensed data. It is here noted that other edge devices 10 may have no sensor at all, or only one sensor or more than three sensors.

In FIG. 3, various options of a system according to FIG. 1 may be envisaged.

In an embodiment, the first and second sensors 12a and 12b of FIG. 1 may be sensors of the same edge device 10. In that case, the processing means 12a or 12b of FIG. 1 may be in FIG. 3 part of the processing means 12 of that edge device 10. The control means 17 of FIG. 1 may then be comprised in the processing means 12 of that edge device 10. Alternatively the control means 27 of FIG. 1 may then be comprised in the processing means 22 of the fog device 20 connected to the sub set of edge devices to which that edge device belongs.

In another embodiment, the first and second sensors 12a and 12b of FIG. 1 may be sensors arranged on two different edge devices 10. In that case the processing means 12a or 12b of FIG. 1 may be in FIG. 3 part of the processing means 12 of the two edge devices on which the sensors are arranged. In that case the control means may only be the control means 27 of FIG. 1 which may then be part of the processing means 22 of the fog device 20 connected to the sub set of edge devices to which the two edge devices belong.

More generally, the sensor 13 may comprises at least one of, preferably at least two sensors, of the following list: an optical sensor such as a photodetector or an image sensor, a sound sensor, a radar such as a Doppler effect radar, a LIDAR, a humidity sensor, a pollution sensor, a temperature sensor, a motion sensor, an antenna, an RF sensor capable of detecting radio waves from RF-enabled devices (such as phones, WiFI access points, Bluetooth devices and other devices), a metering device, a vibration sensor, a malfunctioning sensor, a measurement device for measuring a maintenance related parameter of a component of the edge device, an alarm device. The list above is not exhaustive, and other sensors may be envisaged depending on circumstances. In particular the sensor 13 of the first edge device may comprise an optical sensor such as a photodetector or an image sensor, a sound sensor, and a radar such as a Doppler effect radar. Such a combination of sensors is both practical and efficient mimicking the human senses of touch, hearing and sight.

The first edge device 10 and the second edge device 10' further comprise an edge processing means 12 configured to produce edge processed data based on the environmental data, the edge processed data comprising at least one value representative for a class attributed to the event. The first edge device 10 and the second edge device 10' further comprise each an edge communication means 11 for communicating edge processed data. The edge processed data may comprise at least one value representative for a class attributed to one or more events from each data sources.

Some practical examples are further given for illustration:

In an example where the network system is applied in the context of a toll station, and the event detected relates to the presence of vehicles, the class attributed to the event may relate to the type of vehicle detected, whether a car, a motorcycle, a bike or a truck.

In another example, when the network system is applied to a network of smart trash bins in a smart-city and the event detected may be the remaining available countenance of the trash bin, the class attributed to the event may relate to the status of the bin, whether full and out-of-order or still in use.

In another example where the network system is applied in the context of smart lighting and the event detected may relate to the detection of a moving object (e.g. car, pedestrian, cyclist) along a road provided with luminaires, the class attributed may relate to the type of moving object and optionally an associated required lighting status, e.g. a stand-by lighting mode or an active lighting-mode.

In another example where the network system is applied in the context of traffic control in a smart-city and the event may relate to the detection of the movement of vehicles, or to pollution levels, the class attributed may relate to the fluidity of the traffic, whether fluid or jammed, or to the composition of the traffic, whether the proportion of trucks is above or below a threshold level, or for pollution, whether pollutions levels are above or below health safety norms.

As explained above, the subset of edge devices 10, 10' may further comprise one or more additional edges device n like the first and the second edge device and/or one ore more additional edge devices n+1 without a data source. An edge device labelled n may comprise a data source to exchange in a bidirectional manner data with the fog device 20 whereas an edge device labelled n+1 may for example be exempt of a data source and merely act as a receiver for the fog device 20. For example, if the fog device detects an alarm situation based on edge processed data received from edge devices 10, it may control an edge device 10' to take an appropriate action, e.g. signal an alarm situation to the controller 14' of the edge device 10' in order to display an appropriate message on a display 15'. The alarm situation could be e.g. a high level of pollution.

The fog device 20 in FIG. 3, associated with the subset of said plurality of edge devices 10, 10' described above, comprises a fog communication means 21 configured to receive edge processed data from the edge devices 10, numbered 1 to n, and to transmit fog processed data to all edge devices 10, 10', numbered 1 to n+1. The fog device 20 further comprises a fog processing means 22 configured to process the edge processed data received from the subset and to produce fog processed data based thereon, the fog processed data comprising information about at least one event in the edge devices 10 or their vicinity. It is further noted that a fog processing means 22 may be configured to process other data such as raw unprocessed data.

The fog device 20 may further comprise a database 25 and the fog processing means 22 may be configured to use data from the database 25, to process the edge processed data received from the edge devices 1 to n. The data in the database 25 of the fog device 20 may include any one or more for the following: weather related information for the vicinity of the subset, traffic information for the vicinity of the subset, geo-coordinates of the edge devices of the subset. The data in the database 25 may be obtained from the central control system 30 and may included data from the external databases 40 discussed above.

In the example mentioned above, where the network system is applied in the context of traffic control in a smart-city and where the event may relate to the detection of the movement of vehicles and the selected class may be related to the composition of the traffic (for instance whether the proportion of trucks has exceeded a certain level), a database could contain additional information allowing the recognition of special vehicles like ambulances, police cars and firefighting trucks, so that these special vehicles would not be counted in the truck traffic.

Another aspect of this architecture will now be discussed and relates to data fusion. The second edge device 2 of FIG. 3 comprises for instance a first sensor, Sensor 1, configured to obtain first sensed data and a second sensor, Sensor 2, configured to obtain second sensed data. The edge processing means 12 may then be configured to select a first class for an event based on the first sensed data and to select a second class for the same event based on the second sensed data. The edge processing means 12 may then be configured to control the communication means 11 to transmit a single value if the selected first and second class are the same, or the first and second values representative for the selected first and second class if the first and second class are not the same.

When the first class is different from the second class, the fog processing means 22 may be configured to use the data, such as weather related data, from the database 25 and/or the database 40 to determine whether to select the first or second class for the event, and to generate processed fog data including the selected class for the event.

For instance, if the first sensor is an optical camera and the second sensor is a sound sensor. In case of diverging selected classes for the detection of a vehicle in a traffic control system, depending on whether it is day or night, one of the two sensors will be given priority. At night, a sound sensor is likely to be more precise while during day the optical sensor is likely to more accurate. If the first sensor is an optical camera and the second sensor is a Doppler effect radar, depending on the weather, one of the two sensors will be given priority. On a sunny day, an optical camera is likely to be more precise, whereas on a rainy day the accuracy of the Doppler effect radar may be favored. In this way, weather/environment related information affecting the accuracy of sensors in a known way may be taken into account to weight data coming from the sensors. For instance, a camera may have a high accuracy on a sunny day; a sound sensor may have a high accuracy at night, while a radar sensor may not be affected by a rainy day contrary to the camera and the sound sensor.

According to a further aspect of the sensor management, an edge device 10 may be configured to control its one or more sensors and its edge processing means 12 using a machine learning model. For instance neural networks may be envisaged in the edge processing means 12.

The first and second edge device 10 may further comprise one or more additional elements depending on the type of edge device. The first edge device 10 illustrated in FIG. 3 may be a luminaire head comprising a controller 14 for controlling the luminaire and a driver 15 for driving the light source 16 of the luminaire. The second edge device 10 of FIG. 3 may be a smart street furniture component, like a smart connected IoT trash bin comprising street furniture components 16. The one or more edge devices 10 or 10' may comprise a controller 14 or 14' configured to control a component 15 or 15' thereof in function of the received control data. In an example, software and model updates relating to classification may be transmitted from a fog device 20 to a controller 14 or 14' to control the first and second processing means 12a and 12b.

Figure 4:
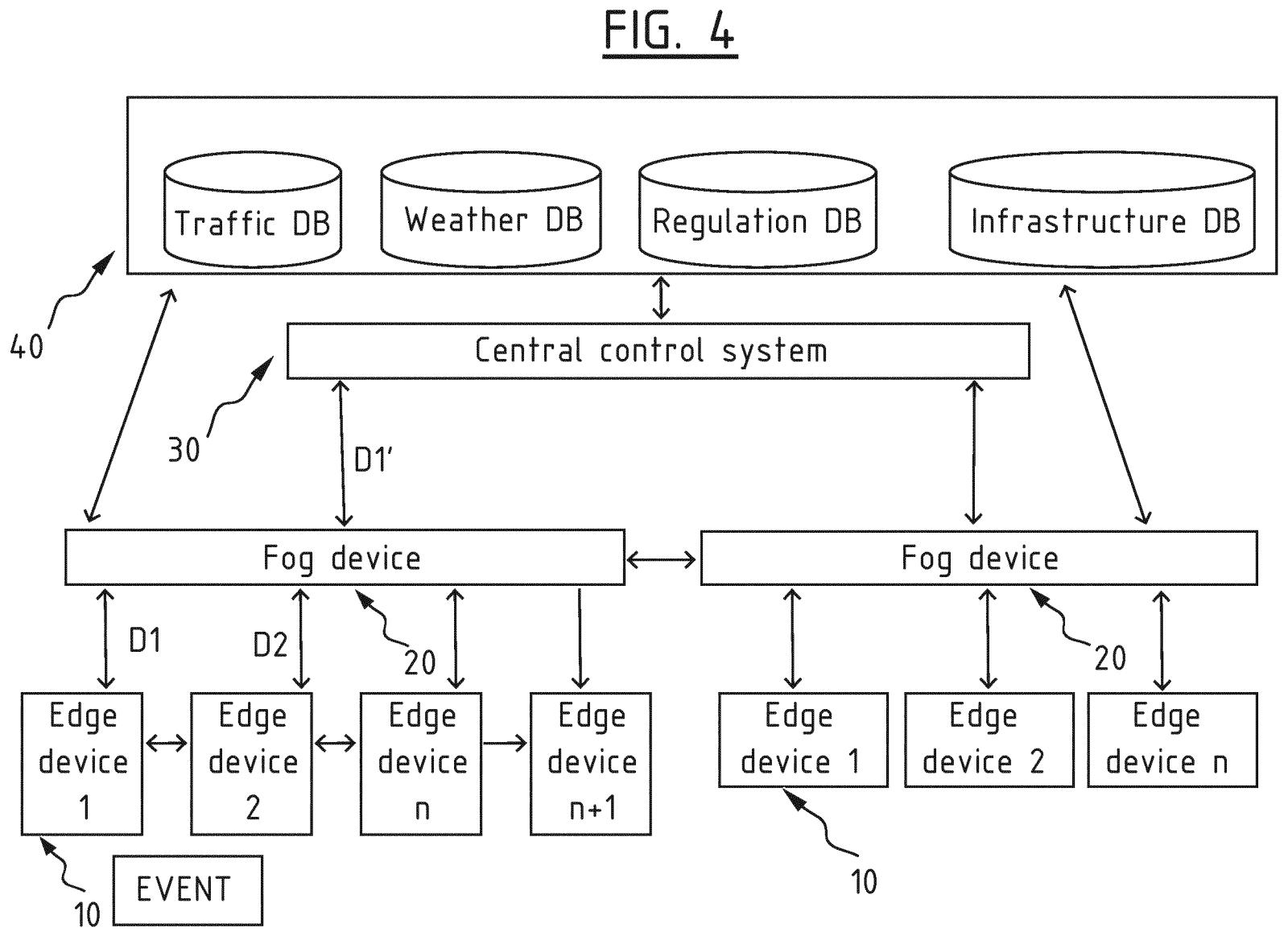

FIG. 4 illustrates a scenario where an event is observed by two edge devices 10 of a subset of n+1 edge devices 10, 10' connected to the same fog device 20. The first and the second edge devices numbered Edge device 1 and Edge device 2 may be adjacent geographically but the teachings of this embodiment should not be limited to this option. The fog device 20 may receive first edge processed data D1 about an event from Edge device 1 and second edge processed data D2 about an event from Edge device 2. The fog device 20 may process the first and second edge processed data, D1 and D2, to determine whether or not the first and second edge processed data D1, D2, relate to the same event, and to transmit fog processed data Dr to the central control system in accordance with the determined result. Additionally more than two streams of edge processed data or other data (e.g. data from a database) may be compiled to generate the fog processed data Dr, and/or more than one event in common may be compiled between the different streams of edge processed data D1-Dn from the subset of Edge devices 1-*n* connected to the fog device 20.

Additionally the fog device 20 may augment the fog processed data D1' using data from a local database (not shown in FIG. 3 but see e.g. database 25 in FIG. 2) or from one of the databases of the database level 40. In one example, the geographical location of an edge device 10 or of multiple edge devices 10 where multiple edge devices have detected the same event, may be added to the fog processed data D1' prior to transmission to the central control system 30 to augment the data. In the case of a city network of trash bins, once the fog has processed which bins are full, a GPS location of each bin may be added to generate an itinerary for the garbage collection services, before sending the data to the central control system 30.

In another aspect, a fog device 20 may be configured to take decisions on the processing and transmitting of the data, said decisions including one or more of the following:

whether or not received data is to be processed by the fog device or to be transmitted to the central control system;

whether or not data processed by the fog device is to be transmitted to the central control system.

It is noted that for some data, the fog device 20 may work autonomously independent of the central control system 30.

According to another aspect a fog device 20 and its associated subset of edge devices 10 may be arranged in a mesh network, where multiple interconnections between edge devices 10 of the subset may be provided. In some network situations, the latency issue may favor a direct edge processing and edge-to-edge communication via the mesh. One example thereof may be for a luminaire network detecting at night an incoming car in a tunnel, communicating to adjacent luminaires in the tunnel directly the need to brighten the lighting without first waiting for the confirmation of the fog device 20. The idea is that an edge device 10 could also send directly control signals to a component 15 of one or more of its neighbors if the need would arise.

The fog devices and edge devices may use a messaging layer protocol for communicating with each other. An exemplary messaging layer M2M protocol is the Lightweight Machine to Machine (LwM2M) protocol defined in Lightweight Machine to Machine Technical Specification, last approved version 1.1.1, Open Mobile Alliance, 25 Jun. 2019. The M2M client device (e.g. included in an edge device) may be configured to obtain environmental data and to generate edge processed data and notify the M2M server device regarding the obtained environmental data and/or the edge processed data. The M2M server device (e.g. included in a fog device) may perform one or more actions in response to the notification.

FIG. 5 illustrates an exemplary embodiment of an edge module comprising a common interface board 18 and three sensors 13, the edge module being connectable to an edge processing means 12. In this exemplary embodiment, three sensors 13 are arranged on the same edge device 10. The data sensors are an optical sensor, an acoustic sensor and a micro-Doppler radar. A common interface 18 is interposed between the sensors 13 and the edge processing means 12 to provide a universal interface that achieves modularity while ensuring compatibility of both data and power signals. To this end, the common interface 18 comprises a signal level translation means for adapting/translating data signal levels of data signals communicated between sensors 13 and processing means 12. An optical sensor may for instance communicate using a MIPI C-PHY or LVDS interface, an acoustic sensor may communicate using an I$^2$S interface, and a micro Doppler radar may communicate using a combination of MIPI C-PHY or LVDS and SPI interfaces. Such standards define the physical layer but not their signal levels. The translation means will then be configured to adapt/normalize these signals to a common signal level, allowing sensors 13 to be able to communicate in a fast, secure and reliable manner with the processing means 12.

The common interface 18 further comprises a power conversion and management means for receiving power from a power source and for converting it, in an efficient manner, into power suitable for powering the sensors 13. Since, each sensor may have different power requirements. The common interface is designed in a manner that it can interact with different data and power standards and ensure compatibility between the devices attached to it. The power source may be envisaged in various ways. For instance, the edge processing means 12 may deliver power to the common interface 18 coming directly from the mains and/or indirectly coming from the driver. Preferably limiting the amount of AC to DC conversions. Alternatively, or additionally the driver may deliver power directly to the common interface 18. In an alternative the edge processing means 12 may have the ability to make smart decisions on which source of power to select depending on the circumstances as well as which sensors to enable/disable in order to ensure the best accuracy at the lowest power consumption.

Figure 6:
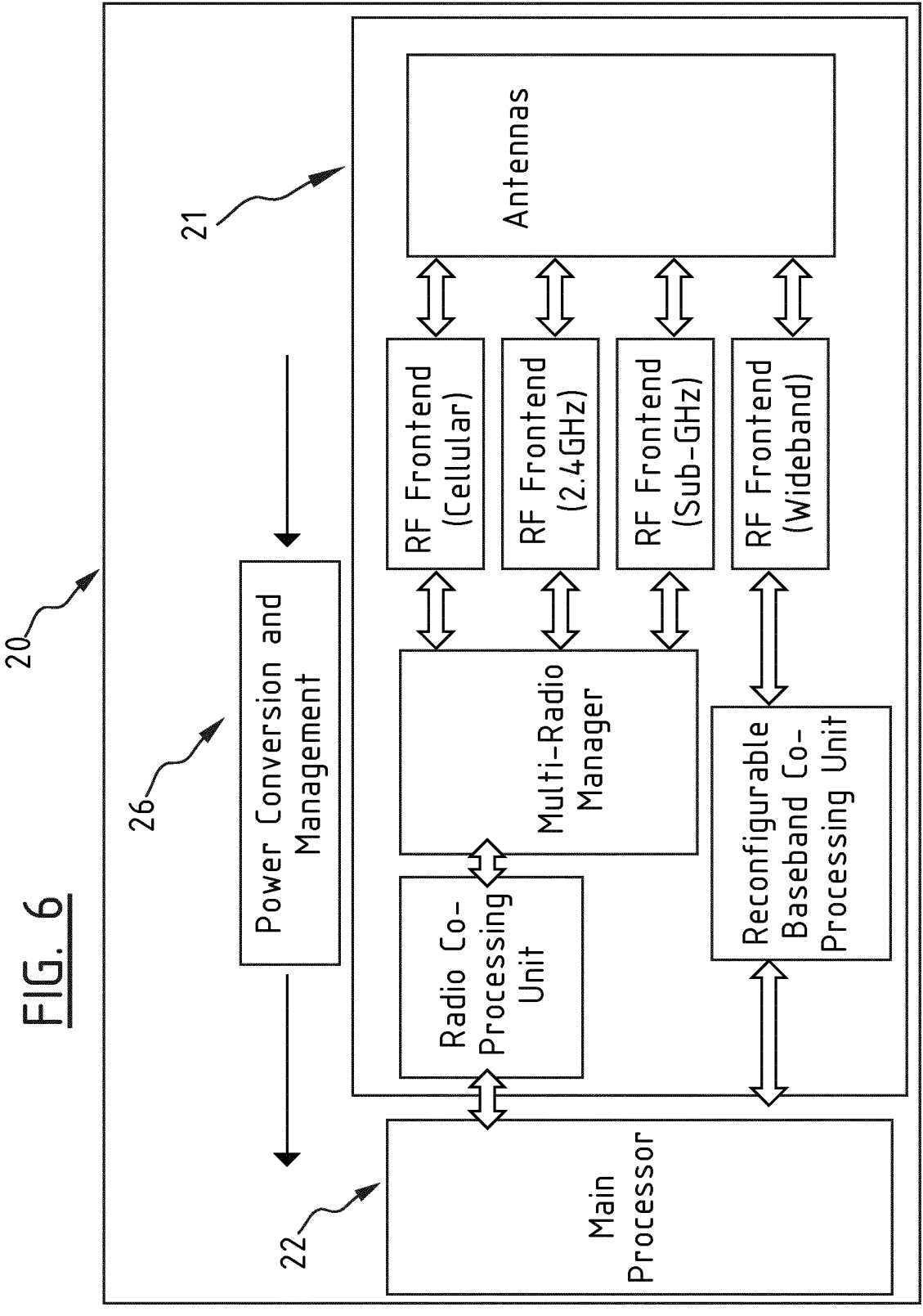
FIG. 6 illustrates an exemplary embodiment of processing means and communication means of a fog device.

FIG. 6 illustrates an exemplary embodiment of a fog device 20. A fog device 20 may comprise communication means 21, processing means 22, and power conversion and management module 26. The communication means 21 may comprise at least three RF front end modules communicating with at least two different edge devices 10 or 10' and the control central means 30. It is noted here that an edge device 10 or 10' may comprise communication means 11 including one RF (Radio Frequency) front end module capable of communicating the edge processed data to the fog device 20. The characteristics of the communication means 11 of an edge device may vary depending on the type of data sources arranged at the edge device 10 or 10'. For instance when the data source 13 connected to the common interface 18 is an optical camera, the processing means 12 may comprise a 2.4 GHz RF front end module, allowing sufficient bandwidth for classes and attributes derived from the edge processing of the camera feed. For other data sources 13 like a sound sensor, a Sub-GHz RF front end module in the communication means 11 may be sufficient for communication with the fog device 20. In contrast, a fog device 20 has more functionality than an edge device 10 or 10' which translates to higher bandwidth needs of the fog communication means 21. A cellular RF front end module may be provided to communicate with the central control means 30. A 2.4 GHz RF front end module may be provided to communicate with a first edge device 10, comprising for instance a camera. A Sub-GHz front end module may be provided to communicate with a second edge device 10', comprising for instance a sound sensor. Each of the above RF front end modules may then interconnect with a multi-radio manager for optimum spectrum management and timings, which in turn interconnects with a radio co-processing unit for protocol related tasks like encoding/decoding packet, etc. An additional wideband RF front end module may be provided to communicate with yet another edge devices 10 or 10' (not shown). The wideband RF Front end module may communicate with a reconfigurable baseband co-processing unit able to be reconfigured, in real time, for a particular type of edge device 10 or 10'. This allows an increased flexibility as any additional edge device having a communication frequency within the wideband range may then communicate with the processing means 22 of the fog device 20. Both the standard and the reconfigurable radio co-processing units may then be in communication with the main processor which forms the processing means 22 and does the actual processing of the received data. The main processor 22 may support an AI engine and/or a DNN engine. The main processor may have high performance, low power consumption, resiliency and versatility. The fog device 20 may further comprise a power conversion and management module 26 receiving AC power and providing DC power to the above-mentioned internal modules/units of the communication means 21 and the processing means 22, in an efficient manner.

It is further noted that an edge module and/or an edge device may be implemented in a functional pole module for use in a modular lamp post as described in EP 3 076 073 B1 in the name of the applicant. EP 3 076 073 B1 discloses a modular lamp post which is readily assembled and installed in the field whilst providing rigidity, structural integrity and sealing. The lamp post comprises a plurality of pole modules mounted on a support pole. The pole modules are connected to one another by respective pole module connectors and one pole module thereof is connected to the support pole by a pole module connector. EP 3 076 073 B1 is included herein by reference.

Figure 8:
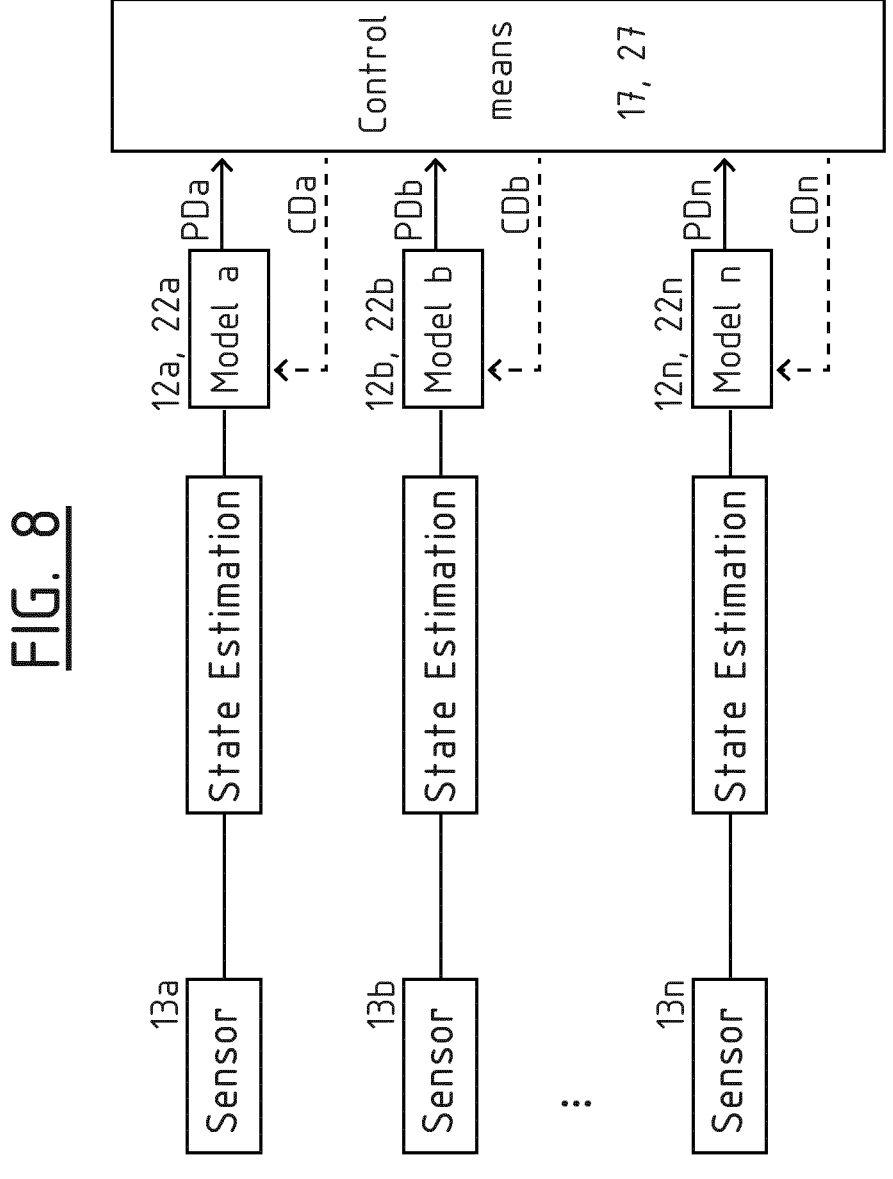
Figure 9:
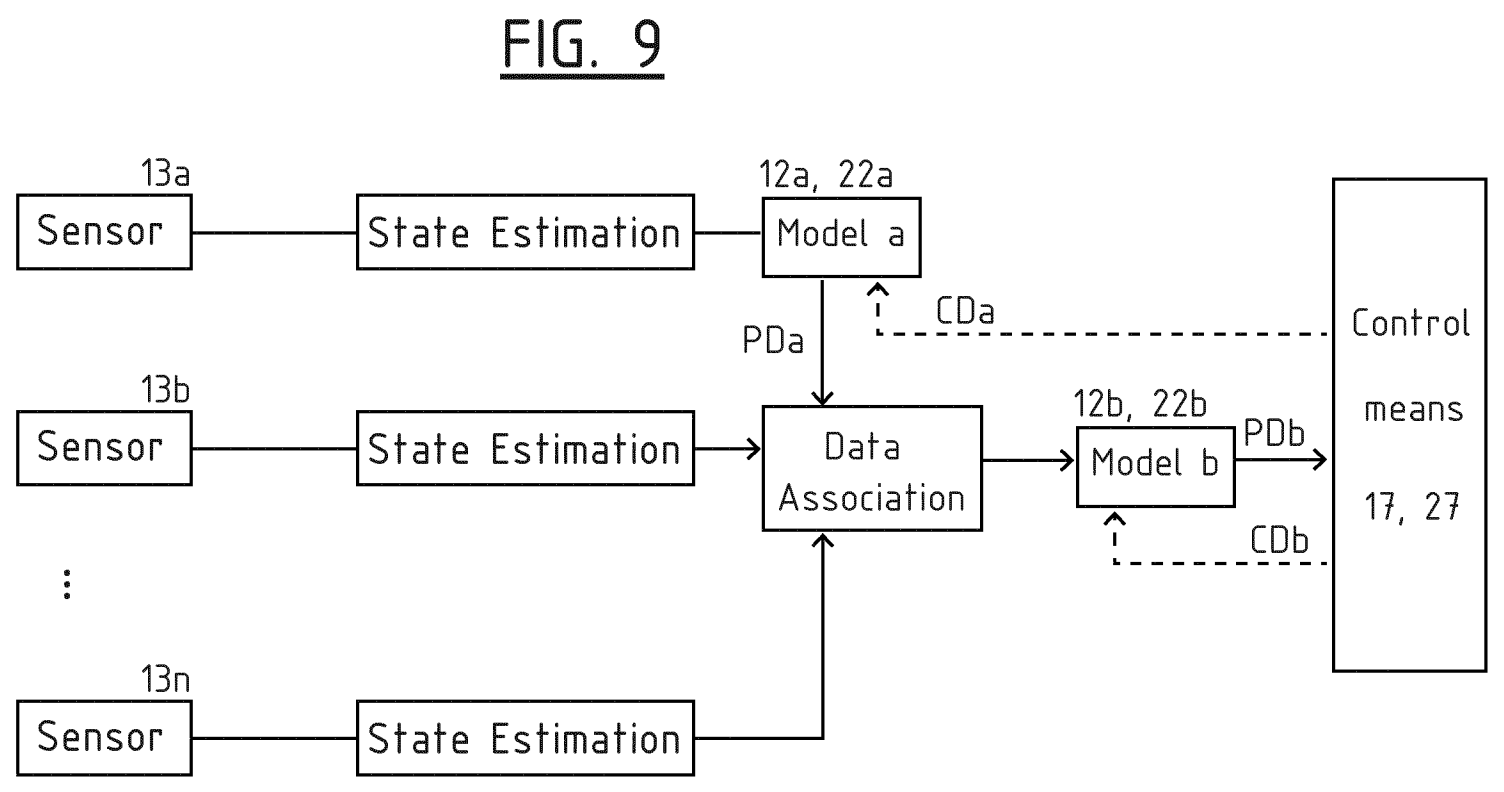

FIGS. 7, 8 and 9 illustrate alternative exemplary embodiments of self-learning systems using models. FIG. 7 illustrates a principle of data fusion where data from a plurality of data sources 13 is first combined by data association and later modelled. A first plurality of data sources 13a may be arranged at the a first edge device 10a (not represented) and may each provide sensed data to the edge processing means 12a of that edge device 10a or to fog processing means 22a of the associated fog device 20. The first plurality of data sources 13a may comprise a first sensor 13a1 and a second sensor 13a2. A second plurality of data sources 13b may be arranged at a second edge device 10*b* (not represented) and each provide sensed data to the edge processing means 12*b* of that edge device 10*b* or to fog processing means 22*b* of the associated fog device 20. The second plurality of data sources 13*b* may comprise a first sensor 13*b*1 and a second sensor 13*b*2. Alternatively there may be a single second source 13*b* and/or the two groups of sensors 13*a* and 13*b* may be arranged on the same edge device.

Each sensed data may then first be separately state estimated to extract at least one feature related to an event. The plurality of results of the state estimation of each data source sensed data may then be grouped and combined by data association. By data association, similar features may be recognized, and different features may be weighted to obtain a vector of features with a potentially larger dimension than each of the original vectors of features obtained by state estimation. A first processing means 12*a* or 22*a* may then process the result of the data association of all the sensors 13*a* according to a first model, Model a, to generate first processed data PDa while a second processing means 12*b* or 22*b* may process the result of the data association of all the sensors 13*b* according to a second model, Model b, to generate second processed data PDb. One model may be better than the other. Models may indeed be ranked depending on circumstances based on any one of the number of classes, the number of subclasses, the number of attributes, the accuracy of the attributes, a reliability index (derived from environment conditions and historical data), etc. For instance a camera sensor will perform much better during the day than during the night, and a noise sensor reporting very high levels for a couple of minutes because of construction work should be disregarded as it will not provided reliable information for car detection.

Control means 17 arranged in an edge device or control means 27 arranged in a fog device may then be configured to fuse the processed data from both models by decision fusion to obtain a final modelling result, e.g. classification and/or attribute(s). If two classifications are the same, a single one may be selected, whereas if they are not the same, one classification may be decided by decision fusion. Control means 17 arranged in an edge device or control means 27 arranged in a fog device may then control one of the first and/or second processing means 12*a*, 22*a* and/or 12*b*, 22*b* to use the processed data obtained with the best model to train the processing means having a worse model. In particular the processed data obtained with the best model may be used to generate control data to change the other one or more models. In case of classification, the finest classification may be used to train the processing means which had provided a coarser classification. It is further noted that although classification has been mainly discussed above, the self-learning systems of the invention using models may also be envisaged for prediction. Based on the results of the decision fusion, the models may thus be updated with a new set of rules for new classes and/or subclasses and/or attributes. It is noted that decision fusion may use additional environmental data for decision, if the results of different models are diverging.

In an exemplary embodiment, a system may comprise a first edge device 10*a* with a single sensor 13*a*1 and a second edge device 10*b* with three sensors 13*b*1, 13*b*2 and 13*b*3. In that example, the edge processing means 12*a* of the first edge device 10*a* may be configured to process the environmental data of its only sensor, in accordance with a first set of classification rules, defining Model a and providing less classes than the set of classification rules of the edge processing means 12*b* of the second edge device 10*b* using Model b. Fog control means 27 may then be able to fuse the two sets of classifications rules by decision fusion to obtain a final classification which may be better than the first and the second classification. Fog control means 27 may further be able control the first and second edge processing means 12*a* and 12*b* such that the second edge processed data PDb is used to train the first processing means 12*a*. In this way the first processing means 12*a* may learn the classification of the second processing means 12*b*, improving thus the first set of rules of the first processing means 12*a*. In other words Model a may be improved based on the results obtained with Model b, for instance control data CDa may be generated such that Model a may be updated with a new set of rules for new classes and/or subclasses and/or attributes.

FIG. 8 illustrates an alternative embodiment of a self-learning system with models where data from a plurality of data sources 13 is first independently modelled, e.g. classified or predicted using a set of rules, and later fused by decision fusion. In that case the separate results of state estimation of the plurality of sensed data from the plurality of data sources 13 are each independently modelled, e.g. classified or predicted. The plurality of results, e.g. classifications or predictions, obtained in this way are then combined by decision fusion to obtain a single result, e.g. classification or prediction of the event.

A first processing means 12*a* or 22*a* may, for instance, process the result of the state estimation of a first sensor 13*a* according to a first model, Model a, to generate first processed data PDa while a second processing means 12*b* or 22*b* may process the result of the state estimation of a second sensor 13*b* according to a second model, Model b, to generate second processed data PDb. One model may be better than the other. Models may indeed be ranked depending on circumstances based on any one of the number of classes, the number of subclasses, the number of attributes, the accuracy of the attributes, etc. Control means 17 at edge level or control means 27 at fog level may then be configured to fuse the processed data from both models by decision fusion to obtain a final classification or prediction. If classifications or predictions of two models are the same, a single one may be selected, whereas if they are not the same, one classification/prediction may be decided by decision fusion. It is noted that decision fusion may use additional environmental data for decision, if the results of different models are diverging. Finally, the processed data obtained by decision fusion may be used to generate control data to change one or more models. In case of classification the finally obtained classification may be used to train the processing means which had provided a different classification. It is further noted that although classification has been mainly discussed above, the self-learning systems of the invention using models may also be envisaged for prediction.

The system of FIG. 8 may be applied in a system comprising for instance two sensors 13*a* and 13*b* arranged on the same edge device. The environmental data from each sensor 13 may be processed independently by a dedicated first processing means 12*a* and 12*b*. A first processing means 12*a* may process the environmental data from sensor 13*a* according to a first model, Model a, while a second processing means 12*b* may process the environmental data from sensor 13*b* according to a second model, Model b, where Model b is better than Model a (finer classification with more classes for instance). Control means 17 arranged in the edge device or control means 27 arranged in the fog device may fuse the results from the two models by decision fusion to keep the best results. Based on the results of the decision fusion, control data CDa and/or CDb may be generated by the control means 17 or 27 such that Model a and/or Model b may be updated with a new set of rules for new classes and/or subclasses and/or attributes It is noted that decision fusion may use additional environmental data for decision, e.g. time of day, humidity. It is further noted that a single classification may comprise multiple values for multiples classes, e.g. a value for a type of vehicle, a value for a color of a vehicle, a value for a brand of vehicle, etc.

It is noted that a fog device 20 receiving a plurality of classifications from a plurality of edge devices 10, may in turn apply the principle of decision fusion to obtain a single classification as fog processed data. The invention will for example be described in a system comprising a first edge processing means 12a generating a first processed data PDa according to a first of rules, Model a, and a second edge processing means 12b generating a second processed data PDb according to a second set of rules, Model b, made on a larger set of classes, due for instance to decision fusion as described with reference to FIG. 8. In that example, the fog processing means 22 may be configured to fuse the results from the two models of classification/attribution by decision fusion to keep the best results as fog processed data. Further fog control means 27 may yet be able to control the first and second edge processing means 12a and 12b such that the second edge processed data PDb is used to train the first edge processing means 12a to improve its classification, e.g. Model a, providing for instance control data CDa for an updated model a.

FIG. 9 illustrates another exemplary embodiment of a self-learning system using models, where the models may be using results of one another in cascade. In that case the result of state estimation of some sensors may be associated to the results of classification of at least one sensor, to be finally classified. A first sensor 13a may be configured to obtain environmental data which is processed by a first processing means 12a or 22a according to a first model, Model a, defined by a first set of rules to generate first processed data PDa. The first processed data PDa of the processing means 12a or 22a may then be combined to the environmental data of a second sensor 13b. A second processing means 12b or 22b may then be configured to process the first processed data PDa combined with the environmental of the second sensor 13b, to generate second processed data PDb according to a second model, Model b, defined by a second set of rules. Control means 17 in the edge device or 27 in a fog device may then further also be able to control the first processing means 12a such that the second processed data PDb is used to train the first processing means 12a providing for instance control data CDa for an updated model a. Similarly control means 17 in the edge device or 27 in a fog device may also be able to control the first processing means 12b such that the second processed data PDb is used to train the second processing means 12b, providing for instance control data CDb for an updated model b. Based on the results of the final classification, the models a and/or b may be updated with a new set of rules for new classes and/or subclasses and/or attributes.

Whilst the principles of the invention have been set out above in connection with specific embodiments, it is understood that this description is merely made by way of example and not as a limitation of the scope of protection which is determined by the appended claims.

The invention claimed is:

1. A smart-city system comprising one or more edge devices, said one or more edge devices being preferably arranged in the vicinity of each other, said system comprising:

at least a first sensor and a second sensor arranged at said one or more edge devices, the first sensor being configured for obtaining first environmental data related to an event in the vicinity of the one or more edge devices, and the second sensor being configured for obtaining second environmental data related to an event in the vicinity of the one or more edge devices;

a first processing means configured to process said first environmental data in accordance with a first set of rules to generate first processed data and a second processing means configured to process said second environmental data in accordance with a second set of rules to generate second processed data;

a control means configured to control the first and second processing means such that the second processed data is used to train the first processing means.

2. The system of claim 1, wherein training the first processing means comprises changing the first set of rules, and wherein the control means is configured for generating first control data to change the first set of rules of said first processing means.

3. The system of claim 1, wherein the second processing means is configured to use said first processed data to process said second environmental data in accordance with the second set of rules to generate the second processed data.

4. The system of claim 1, wherein the first processing means is configured to use additional environmental data from one or more additional data sources to process said first environmental data and/or wherein the second processing means is configured to use the additional environmental data from one or more additional data sources to process said second environmental data.

5. The system of claim 1, wherein the first sensor and the second sensor are configured to obtain data about a same event, and wherein the first set of rules and the second set of rules each comprise rules for deriving properties of the event based on the obtained first and second environmental data, respectively.

6. The system of claim 1, wherein the first set of rules is configured to select one or more classes from a first plurality of predetermined classes for classifying the event, to obtain a first classification based on the first environmental data and wherein the second set of rules is configured to select one or more classes from a second plurality of predetermined classes for classifying the event, to obtain a second classification for the same event based on the second environmental data; and/or wherein the first set of rules is configured to generate a first attribute associated to the event based on the first environmental data, said first attribute characterizing a property of the event and/or wherein the second set of rules is configured to generate a second attribute associated to the event based on the second environmental data, said second attribute characterizing a property of the event.

7. The system of claim 6, wherein the control means is configured to control the first and second processing means such that the second classification and/or second attribute is used to train the first processing means; and/or wherein the control means is configured to control the first and second processing means such that the second classification and/or second attribute is used to change the first set of rules such that a class preferably from the second plurality of predetermined classes is added to the first plurality of predetermined classes and/or to generate the first attribute, wherein preferably the control means is configured to control the first and second processing means such that the second classification and/or second attribute is used to change the first set of rules such that a sub-classification level is added to the first classification.

8. The system of claim 1, wherein the event comprises one of an event related to an object in the one or more edge devices or in the vicinity of the one or more edge devices, an event related to a state of an object in the one or more edge devices or in the vicinity of the one or more edge devices, an event related to the area in the vicinity of the one or more edge devices, an event related to a state of a component of the one or more edge devices.

9. The system of claim 1, wherein the control means is configured to control the second processing means such that the first processed data is used to train the second processing means, wherein preferably training the second processing means comprises changing the second set of rules, and wherein the control means is configured for generating second control data to change the second set of rules of said second processing means.

10. The system of claim 1, wherein the control means is configured to determine whether the one or more edge devices operate in a first modus where the first processing means is known to provide better results than the second processing means or in a second modus where the second processing means is known to provide better results than the first processing means, and wherein the control means is configured to control the first and second processing means such that the second processed data is used to train the first processing means in the second modus, and to control the first and second processing means such that the first processed data is used to train the second processing means in the first modus, wherein preferably the control means is configured to determine whether the one or more edge devices operate in the first or second modus based one any one or more of the following conditions: a time of the day, a date of the year, a weather condition, a light intensity, a humidity level, a temperature, a pollution level, a type of event, age or lifetime of the first and/or second sensor.

11. The system of claim 1, wherein the first sensor and the second sensor are arranged in the same edge device, wherein preferably the first sensor and the second sensor are connected to a common interface board of the edge device.

12. The system of claim 1, wherein the first sensor and the second sensor are arranged in neighboring edge devices.

13. The system of claim 1, wherein the first processing means and/or the second processing means are arranged in the one or more edge devices.

14. The system of claim 1, further comprising a fog device at a distance of the one or more edge devices, wherein the first processing means and/or the second processing means are arranged in the fog device.

15. The system of claim 1, wherein the first and/or second sensor is selected from: an optical sensor such as a photodetector or an image sensor, a sound sensor, a radar such as a Doppler effect radar, a LIDAR, a humidity sensor, a pollution sensor, a temperature sensor, a motion sensor, an antenna, an RF sensor, a vibration sensor, a metering device, a malfunctioning sensor, a measurement device for measuring a maintenance related parameter of a component of the edge device, an alarm device; and/or wherein the first and second sensors are selected from an optical sensor such as a photodetector or an image sensor, a sound sensor, and a radar such as a Doppler effect radar.

16. The system of claim 1, wherein the one or more edge devices are arranged in a mesh network, wherein preferably the one or more edge devices are configured to communicate through at least an IEEE 802.15.4 protocol;

wherein preferably the system further comprises a fog device at a distance of the one or more edge devices, wherein the first processing means and/or the second processing means are arranged in the fog device, wherein the fog device is also part of the mesh network.

17. The system of claim 1, wherein the control means is configured to adjust measurement settings of the first sensor based on the second processed data and/or to adjust measurement settings of the second sensor based on the first processed data.

18. The system of claim 1, further comprising a communication means configured to receive data about an event in the vicinity of the one or more edge devices from a central database, and wherein the first and/or second processing means are configured to use said data for processing the first and/or second sensed data and/or for training the first and/or second processing means, wherein preferably the control means is configured to adjust measurement settings of the first and/or second sensor based on the received data.

19. The system of claim 1, wherein the one or more edge devices comprise any one or more of the following: a luminaire, a bin, a sensor device, a street furniture, a charging station, a payment terminal, a parking terminal, a street sign, a traffic light, a telecommunication cabinet, a traffic surveillance terminal, a safety surveillance terminal, a water management terminal, a weather station, an energy metering terminal, an access lid in a pavement.

20. A system comprising one or more edge devices, said one or more edge devices being preferably arranged in the vicinity of each other, said system comprising:

at least a first sensor and a second sensor arranged at said one or more edge devices, the first sensor being configured for obtaining first environmental data related to an event in the vicinity of the one or more edge devices, and the second sensor being configured for obtaining second environmental data related to an event in the vicinity of the one or more edge devices;

a first processing means configured to process said first environmental data in accordance with a first set of rules to generate first processed data and a second processing means configured to process said second environmental data in accordance with a second set of rules to generate second processed data;

a control means configured to control the first and second processing means such that the second processed data is used to train the first processing means;

wherein the control means is configured to determine whether the one or more edge devices operate in a first modus where the first processing means is known to provide better results than the second processing means or in a second modus where the second processing means is known to provide better results than the first processing means, and wherein the control means is configured to control the first and second processing means such that the second processed data is used to train the first processing means in the second modus, and to control the first and second processing means such that the first processed data is used to train the second processing means in the first modus.

\* \* \* \* \*